United States Patent [19]
Hatch et al.

[11] Patent Number: 5,386,776
[45] Date of Patent: Feb. 7, 1995

[54] BORE MITIGANTS FOR SOLID PROPELLANT ROCKET MOTORS

[75] Inventors: Robert L. Hatch, Wellsville; Robert D. Taylor, Hyrum; Jerald C. Hinshaw, Ogden, all of Utah

[73] Assignee: Thiokol Corporation, Ogden, Utah

[21] Appl. No.: 22,180

[22] Filed: Feb. 24, 1993

[51] Int. Cl.$^6$ .............................................. C06B 45/00
[52] U.S. Cl. .................................. 102/290; 102/287; 102/291
[58] Field of Search ................................ 102/287–291

[56] References Cited

U.S. PATENT DOCUMENTS

| | | | |
|---|---|---|---|
| 3,421,325 | 1/1969 | Thibodaux, Jr. | 60/255 |
| 3,468,125 | 9/1969 | Cramer, Jr. | 60/39.47 |
| 3,718,095 | 2/1973 | Munger et al. | 102/102 |
| 4,364,300 | 12/1982 | Pagano et al. | 89/36 A |
| 4,489,657 | 12/1984 | Langer | 102/290 |
| 4,574,700 | 3/1986 | Lewis | 102/287 |
| 4,696,233 | 9/1987 | Paxton | 102/287 |
| 4,756,248 | 7/1988 | Sato | 102/287 |
| 4,813,334 | 3/1989 | Bloks et al. | 89/36.02 |
| 4,878,431 | 11/1989 | Herring | 102/290 |
| 5,007,343 | 8/1991 | Marks | 102/290 |
| 5,189,247 | 2/1993 | Andre et al. | 102/291 |

*Primary Examiner*—Peter A. Nelson
*Attorney, Agent, or Firm*—Madson & Metcalf

[57] ABSTRACT

Methods and materials for modifying rocket motors to render them safer are disclosed. The invention is primarily related to placing within the bore of a rocket motor a sufficient quantity of a material mitigant such that if the rocket motor receives an unintended impact, the material mitigates the effects of the impact, and prevents ignition or explosion of the propellant. The material mitigant may take a number of forms; however, polymer foams and fibers of various types have been found to work well. It is presently preferred that the material mitigants have a density of not less than approximately 0.04 grams/cc. Examples of such materials include polyurethane foam, polystyrene, and Kevlar ® fibers. It is also preferred that the material mitigant not be reactive with the propellant in the rocket motor. While the material mitigant is configured such that it absorbs fragments or energy of propellant dislodged by the impact, at the same time it does not interfere with the normal ignition and operation of the rocket motor.

25 Claims, 3 Drawing Sheets

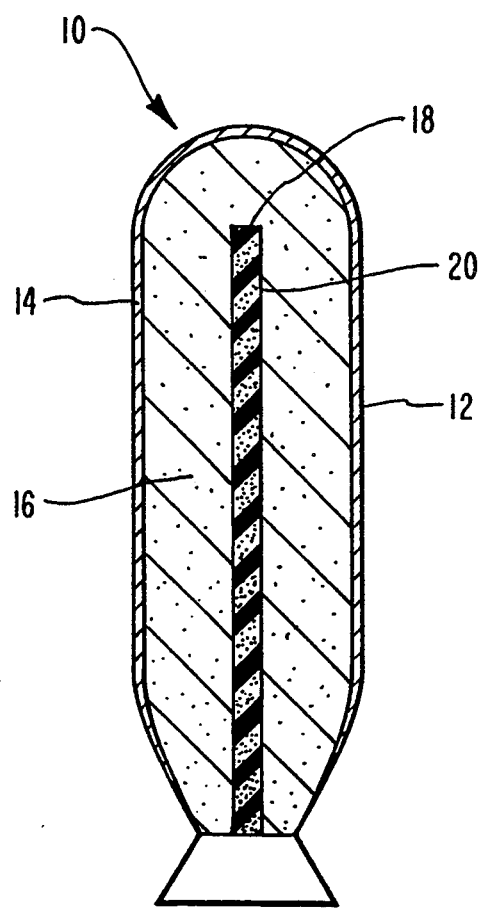
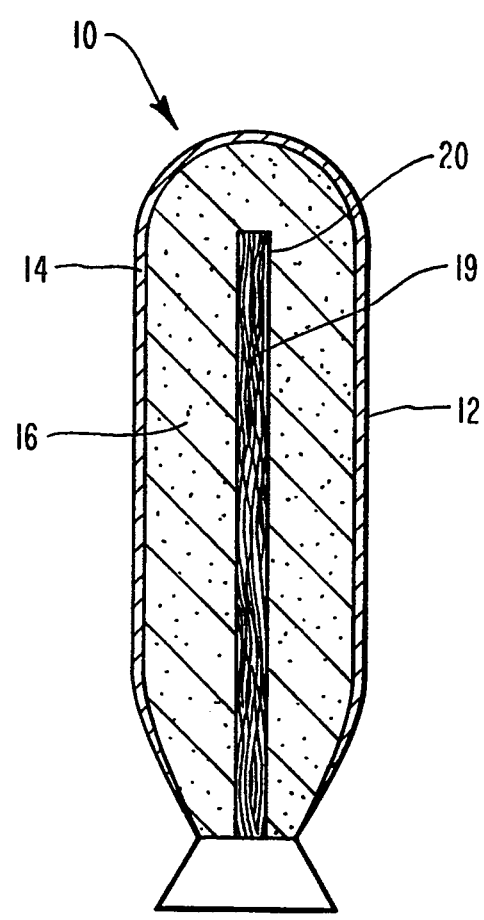
FIG. 1
FIG. 2

BORE MITIGANTS FOR SOLID PROPELLANT ROCKET MOTORS

BACKGROUND

1. The Field of the Invention

The present invention relates to means for mitigating the effects of unintentional impacts on solid propellant rocket motors. More particularly, the present invention relates to solid propellant rocket motors having material mitigants disposed within the rocket motor bore such that accidental explosion and ignition are avoided.

2. Technical Background

A major concern in the defense and aerospace industries is safety. Safety concerns continue to be at the forefront of the development of new products and devices for use in these, and other related industries. Safety concerns are very important when it is necessary to require people to work around devices which are potentially explosive, flammable, or which contain other types of energetic compositions, such as propellants and illuminants.

Problems in dealing with explosive, flammable, or energetic materials are heightened when such materials may potentially be used in combat situations, or during unconventional flight. In these situations, probabilities increase that the device will be impacted by a flying projectile or otherwise disturbed. For example, in combat situations, it is not inconceivable that a stray projectile, such as a bullet, could penetrate a device containing an explosive or propellant material. When rocket motors are stored on ships or aircraft, the chance that they may fall or be bumped is increased. All of these situations present safety concerns because it is known that striking or disturbing these types of devices may lead to accidental ignition or explosiion.

Since modern combat operations depend heavily on the use of rocket motors to deliver ordinance, or to propel other types of devices, it is often necessary for combat personnel to operate in the presence of such rocket motors. This presents a direct safety risk in that there is also an increased chance of such motors being struck or unintentionally disturbed.

In response to these concerns, various government agencies and military services have issued "insensitive munitions" guidelines and related standards for materials used in the defense and aerospace fields. These guidelines and standards seek to assure that the chance of accidental ignition or explosion is minimized. Clearly these standards and guidelines, as well as safety concerns generally, present challenges in the manufacture of rocket motors and other similar types of devices.

It is well known that many rocket motors react violently when impacted with a bullet or high speed fragment. For example, the Standard Missile Motor is known to react explosively to bullet impact, as well as to fast and slow cookoff conditions. As a result, this rocket motor is not in compliance with the insensitive munitions requirements of the Department of Defense (known as DoD-STD-2105A), even though this device has wide application. Thus, while the Standard Missile Motor uses high performance components, it suffers from the drawback of not meeting insensitive munitions standards.

It will be appreciated that the typical rocket motor is comprised of several standard components. A rocket motor typically has an exterior case made of metal or filament wound composite materials. These materials are light weight, yet strong and resilient. Placed within the case is an insulation layer. This layer protects the case from the burning propellant, also contained within the case. In most modern rocket motors, a bore is disposed within the propellant grain. The typical bore is simply a cylindrical opening which runs through the length of the propellant grain. The bore may be specifically engineered to enhance the performance of the rocket motor. Thus, bores of various sizes, shapes, and configurations are found in the art.

It has been determined that one of the causes of violent reactions when rocket motors are penetrated by projectiles is the fragmenting of the propellant. Most propellants are comprised of energetic and oxidizing solids incorporated into a polymeric binder. Typically, rocket motor propellants have a high percentage of solids loaded in the binder. This results in propellants that are relatively frangible.

As a result, it is found that when a projectile penetrates a rocket motor and passes through the propellant grain, the propellant near the penetration tends to shatter and produce a cloud of propellant dust. As the projectile moves into the center of the propellant grain, and passes through the bore, shattered propellant is sprayed from one side of the propellant grain, through the bore, and onto the opposite side of the bore. It is found that when this shattered propellant cloud impacts with the far side of the bore, ignition or explosion may occur.

Thus, ignition of the fragmented, granular propellant is likely to occur during the expansion of the propellant cloud and during impact of the propellant cloud (and the projectile) with the far bore surface. Undamaged propellant in the bore may also be ignited from collision with the fragmented particles. Although burning fragments have been observed during the entrance and exit of the projectile, it appears that the main cause of rocket motor explosions is the interaction of the fragmented propellant with the rocket motor bore.

Accordingly, it would be a significant advancement in the art to provide rocket motors and similar devices which were safer to handle and use. In particular, it would be an advancement in the art to provide such devices which have the potential for meeting government insensitive munitions standards. In that regard, it would be an advancement in the art to provide means for controlling the flight and impact of fragmented propellant when a rocket motor is penetrated by a projectile in order to reduce the risk of ignition or explosion.

Such methods and apparatus are disclosed and claimed herein.

BRIEF SUMMARY AND OBJECTS OF THE INVENTION

The present invention is related to a rocket motor apparatus and related methods which employ material mitigants in order to render the motors insensitive. In essence the invention relates to placing such material mitigants in the bore of the solid propellant rocket motor. The result is that the rocket motor is much less likely to violently react to impact, especially impact from a bullet or other similar type of projectile.

As discussed above, violent reactions are likely as the projectile and fragments of propellant pass through the bore and strike the propellant on the far side of the bore. The bore mitigant materials taught by the present invention interfere with these projectile/propellant/bore interactions.

Material mitigants for use in the present invention can be made from any one of a number of suitable materials. For example, they can be made from foams such as polystyrene or polyurethane. Alternatively, the material mitigants can be made from fibrous materials such as Kevlar ® fiber. The material mitigants may fill the entire bore volume, or it may be shaped with air pockets or with passages down the bore.

It is important that the material mitigant placed within the bore not interfere with the operation of the rocket motor. The material mitigants are preferably materials which will be ejected during ignition of the rocket motor. In that regard, it is preferable that the materials be friable, such as foamed materials and foamed materials with filler additives. Using these materials it is possible to provide materials of variable local density but with overall low bulk density.

The material mitigants of the present invention are also preferably non-reactive with the propellant. For example, it is desired to use materials which will not chemically cross-link with the propellant grain. This avoids problems which may occur due to chemical modification of a specifically designed propellant, and with modifying the performance characteristics of the propellant.

It is also important that the material used be of sufficient density. It is found that materials must have a certain density in order to perform effectively. Materials having densities below approximately 0.04 grams/cc are generally found to be inadequate as material mitigants in rocket motor bores. Materials having densities above 0.04 grams/cc, and more preferably above 0.06 grams/cc, are found to perform effectively.

In summary, several criteria are evaluated in determining whether a particular material meets the requirements for use as a material mitigant. The material must be light weight in order not to interfere with the overall performance of the device in which it is used. The material must allow for normal ignition and operation of the rocket motor (or other device). The material must not cause damage during operation of the device. For example, in the case of a rocket motor, the material mitigants must not damage the rocket nozzle upon ignition and ejection of the material mitigant. Finally, as menioned above, it is important that the material mitigant have sufficient density to perform the desired function.

The present invention is found to be particularly advantageous in that there is minimal impact on the design and operation of the host device (such as a rocket motor). At the same time, it is possible to use relatively low cost and readily available materials as material mitigants. It is also possible to insert the material mitigant into the device in a number of different ways. Thus, it is possible to retrofit existing devices, or to form the device around the material mitigant. It is also possible to simply insert fibers or balls of the material in order to obtain the desired result.

It is, therefore, an object of the present invention to provide rocket motors and similar devices which are safer to handle and use than are conventional devices of this type.

It is a further object of the present invention to provide such devices which meet government insensitive munitions standards.

It is a related object of the present invention to provide means for controlling the flight and impact of a fragmented propellant cloud when an rocket motor is penetrated by a projectile, in order to reduce the risk of ignition or explosion.

These and other objects and advantages of the invention will become apparent upon reading the following detailed description and appended claims, and upon reference to the accompanying drawings.

BRIEF DESCRIPTION OF THE DRAWINGS

In order that the manner in which the above-recited and other advantages and objects of the invention are obtained, a more particular description of the invention briefly described above will be rendered by reference to the appended drawings. These drawings depict only typical embodiments of the invention and, related data, and are not therefore to be considered limiting of its scope. The invention will be described and explained with additional specificity and detail through the use of the accompanying drawings in which:

FIG. 1 is a cross sectional view of a rocket motor employing a foam material mitigant in the bore.

FIG. 2 is a cross sectional view of a rocket motor employing fibrous material as a material mitigant in the bore.

DETAILED DESCRIPTION OF THE PREFERRED EMBODIMENTS

Figure 3:
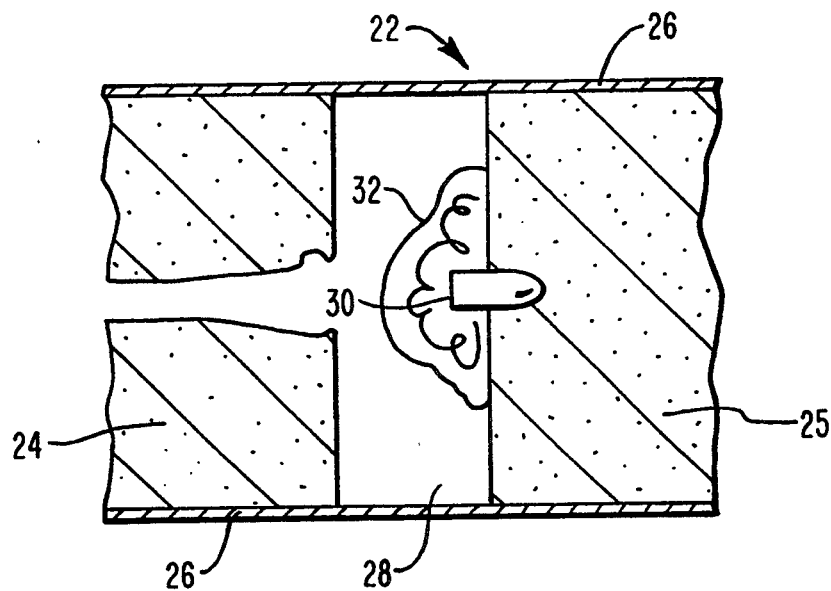
FIG. 3 is a cross sectional diagram of a test device shown testing a propellant grain without a material mitigant in the bore.

The present invention can be best understood by reference to the drawings wherein like parts are designated with like numerals throughout. As mentioned above, the present invention relates to the use of material mitigants within the bore of a rocket motor, or within similar openings in other types of similar devices. The material mitigant is chosen such that when positioned within a bore, it is capable of largely absorbing propellant fragments that would otherwise form a propellant cloud when the rocket motor is impacted with a projectile, or otherwise violently disturbed.

As used herein the term mitigant material is defined to mean a material which meets the required selection criteria for reducing over pressurization and reaction violence in rocket motors in the manner described above. Those criteria require that the material have sufficient density to mitigate the effects of the penetration or violent disturbance. It is presently preferred that the materials have densities of at least 0.04 grams/cc, and more preferably at least 0.06 grams/cc.

It is also presently preferred that the material mitigant not react significantly with the propellant grain. The material must also be of relatively light weight in order not to interfere with the design and operation of the rocket motor. In that regard the material must allow for operation of the rocket motor, including rocket motor ignition, without hindering such operation. It is preferred that the material be capable of being expelled from the rocket motor without damage to the rocket motor nozzle or other parts of the rocket motor.

Thus, it can be seen that foams and fibers of the types described herein are presently preferred. Other types of materials may meet certain criteria, but have other limitations. For example, it is possible to conceive of materials that would meet the density criteria, but not meet the other needs of the device. Most metals would fall within this category.

With these selection criteria in mind, several materials have been identified which are desireble for use as material mitigants. Such materials include polymer foams, such as polyurethane and polystyrene foams. Other similar foams may be based on polyethylene, latex rubber, cellulose acetate and urea-formaldehyde. Such materials also include fibers. Examples of such fibers include Kevlar ® fibers, cotton (cellulose), and polyester. Other types of materials may include hollow glass microspheres and hollow plastic microspheres.

It will be appreciated that in certain applications it will be desirable to add other materials to the material mitigant. For example, flame retardants or other combustion modifying materials and conventional fillers may be added to the extent desired for specific applications.

Referring next to the drawings, FIG. 1 illustrates a typical rocket motor having material mitigants placed within the bore. The rocket motor is generally designated 10. The rocket motor is comprised of a casing 12. The casing 12 will typically be made of a metal or a filament wound composite material. This is, of course, not critical to the operation of the present invention, and other types of devices with other types of casing also fall within the scope of the present invention.

Disposed within the interior of the motor casing is an insulation/liner layer 14. The insulation/liner 14 may be any type of liner conventionally used in the aerospace industry. The insulation liner layer is used in order to insulate the casing from the propellant and to aid in positioning the propellant grain with respect to the casing. Again, there are numerous types of insulation and liners which are known and conventional in the art, and the type of insulation or liner is not important to the operation of this invention. Indeed, some types of devices which use the present invention may eliminate the insulation or liner entirely.

Immediately adjacent to the insulation/liner layer 14 is the propellant grain 16. The propellant grain 16 will typically be formed of a propellant comprised of energetic solids incorporated into a polymer binder matrix. For example, hydroxy-terminated polybutadiene (HTPB) binders are widely used and provide one example of a polymer binder. Other conventional propellants are based on polyethyleneglycol (PEG). Incorporated within the binder are various solids, including energetic solids and oxidizers. Typical solids may include materials such as ammonium perchlorate, HMX, RDX, and aluminum. Numerous propellants of this type are conventional and well known in the art.

In many applications it is desirable to incorporate large quantities of solids into the polymer matrix in order to provide a propellant which produces maximum output. It will be appreciated, however, that by using such large quantities of solids, the propellant may be relatively friable and easily fragmented when inadvertently impacted. This problem is dealt with by the present invention.

Referring once again to FIG. 1, a quantity of material mitigant 18 is illustrated disposed within the bore 20 of the rocket motor 10. It is found that if the rocket motor 10 is inadvertently disturbed, or penetrated by a projectile, the reaction of the propellant 16 to such a disturbance is greatly reduced by the existence of the material mitigant 18 placed within the bore 20. In particular, the material mitigant 18 is able to absorb particles of propellant and absorb energy that would otherwise move freely through the bore and form a propellant cloud in the manner described above.

FIG. 2 illustrates a slightly modified embodiment of the invention. FIG. 2 illustrates an identical rocket motor, however, the bore is filled with fibers 19, rather than a solid piece of material, such as that illustrated in FIG. 1. As will be discussed in more detail below, fibrous materials serve well as material mitigants if they meet the selection criteria identified above. In some embodiments a gap may be including within the center of the material mitigant.

Figure 4:
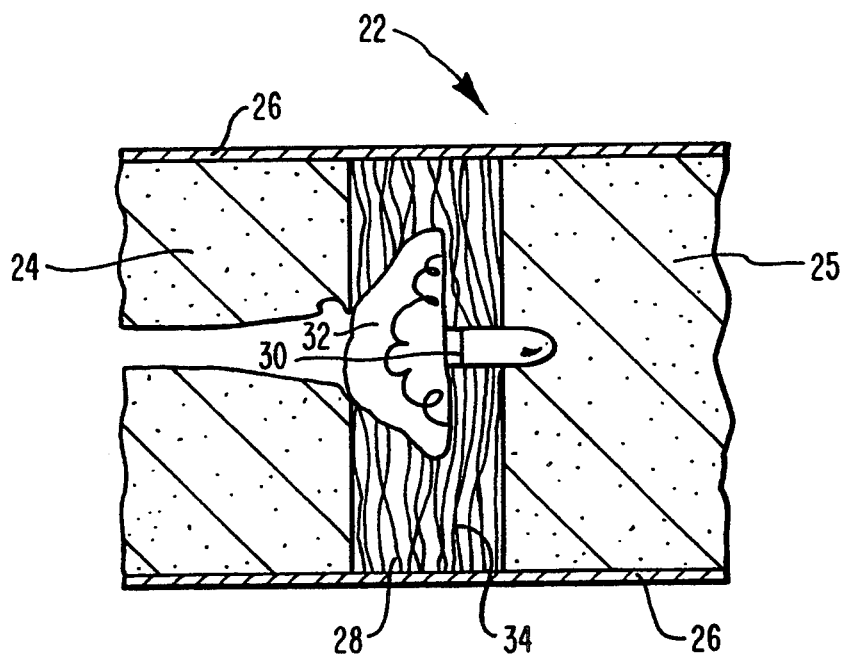
FIG. 4 is a cross sectional diagram of a test device shown testing a propellant grain employing a material mitigant in the bore.

The effect of the use of material mitigants can be more fully appreciated by reference to FIGS. 3 and 4. FIGS. 3 and 4 illustrate a typical test cell 22 for use in determining the effectiveness of various material mitigants. Referring first to FIG. 1, two slabs of propellant 24 and 25 are held in place between a pair of steel plates 26. A gap 28, representing a rocket motor bore, is left between the propellant slabs 24 and 25.

In one actual test cell, two one (1) inch thick slabs of propellant where held in place between a pair of 1/16 inch hardened steel plates. In these tests, a gap of 2.6 inches was left between the propellant slabs in order to simulate an actual rocket motor bore. The dimensions of the propellant slabs and the steel plates were about 3.5 inches by about 4.75 inches. The sides of the test cell were then enclosed with 0.25 inch thick sheets of plexiglass (not shown).

Projectiles are then directed into the test cell 22 and the results recorded. The test cell 22 is able to simulate the environment of a rocket motor containing the propellant being tested. In the tests described below, the actual projectiles used were ¾ inch diameter soft steel spheres which were shot from a 20 mm gun into the test cell. Velocities of the projectiles were approximately 3,800 feet/sec. (±40 feet/sec.).

Rounds were made by loading 20 mm M103 cartridges with a double load consisting of 310 grains of IMR-3031 and 50 grains of Unique powder. The gun was placed 20 feet from the test cell with a blast shield 10 feet from the target.

The results of the impact of the projectiles on the test cell were recorded by video camera. Blast over pressure recording took place at 12 and 18 feet from the test cell. High speed photography at 32,000 frames per second was used to record the event.

FIG. 3 illustrates a test cell without any mitigant material placed within the gap 28. As the projectile 30 penetrates the first slab of propellant 24, a cloud 32 of propellant fragments is created. The cloud 32 and the projectile 30 then impact the second propellant slab 25. This simulates the effect of penetrating an actual rocket motor. In most tests without mitigant, it is found that extreme blast over pressure is experienced at this point. That is, the propellant ignites or explodes due go this impact within the rocket motor.

FIG. 4 illustrates the test cell 22 set up as described above, but with a material mitigant 34 placed within the gap 28. The projectile 30 once again penetrates the first slab of propellant 24 and causes a cloud 32 of propellant. This time, however, the cloud is immediately absorbed by the material mitigant 34 placed within the gap 28. If the material mitigant meets the selection criteria identified above, it is found that there is little blast over pressure experienced.

Ten tests were actually performed in order to confirm the effectiveness of the material mitigant concept. The results of the ten tests are summarized in Table I below. Tests 1 and 2 were conducted using conventional TP-H1206C propellant which is comprised of an HTPB binder and ammonium perchlorate, HMX and aluminum solids, but without a material mitigant in the gap. As can be seen from Table 1, a violent over pressure was experienced. The violent reaction propelled the steel plates some 200 feet, and no large pieces of the plexiglass plates were recovered.

In samples 3, 7, 8, and 9 polyurethane foams of different densities were tested for use as material mitigants. Sample 3 and sample 7 employed medium density (0.083 gram/cc) polyurethane foam. These tests confirmed that low reaction violence is experienced when using this material. Specifically, blast over pressure at twelve feet from the target was reduced from the baseline of 1.52 psig to 0.28 psig.

The foam used in samples 3 and 7 was Stepanfoam BX-273-8, which is available from Stepan Company. This foam is processed at ambient temperature and cured in the gap between the propellant slabs. The foam is a rigid carbon dioxide blown foam with a reported crush strength of 150 psi.

Sample 8 used a very dense foam (0.67 gram/cc). Using this material, over pressure was greatly reduced. Little, if any, reaction of the propellant occurred. Both propellant slabs were recovered unburned.

Sample 9 used a polyurethane foam of about half the density of sample 7. The over pressure was found to be intermediate between the baseline and sample 7. This indicates that higher density foams are generally more desirable, but that lower density materials also provide significant benefits.

In samples 5 and 10, two different densities of polystyrene foams were tested as possible material mitigants. The higher density foam reduced the over pressure from the baseline. The lower density foam appeared to have little effect. Thus, it appears that materials with densities below approximately 0.040 grams/cc are not particularly effective in mitigating the effect of a projectile penetration on this particular propellant.

Sample 6 tested loose Kevlar ® fibers as a material mitigant. The fibers were placed in the gap in a random manner. The density listed in Table 1 is the average density of the fibers in the volume of the space between the propellant slabs. This mass of fibers had no crush strength, as opposed to the other mitigant materials which were more or less rigid. The Kevlar ® fibers also reduced the overpressure significantly, although the polyurethane foams appeared to be somewhat preferable.

TABLE I

| | | | BORE MITIGANT TEST RESULTS | | |
|---|---|---|---|---|---|
| Specimen | Bore Mitigant | Density (gm/cc) | Overpressure at 12 ft (psig) | Overpressure at 18 ft (psig) | Comments |
| 1 | None | — | 1.58 | 0.89 | Violent. Pieces thrown 200 ft. |
| 2 | None | — | 1.52 | 0.87 | Violent. Pieces thrown 200 ft. |
| 3 | Polyurethane Foam | 0.083 | 0.28 | 0.21 | Greatly reduced violence. Ball was deflected to target by the witness plate. |
| 4 | Polyurethane Foam 1.1 in. air gap | 0.083 | 0.78 | 0.46 | Reduced violence from #1 |
| 5 | Polystyrene Foam | 0.030 | 1.16 | 0.67 | |
| 6 | Kevlar Fibers | 0.013 | 1.03 | 0.60 | Face plate thrown 200 ft. |
| 7 | Polyurethane Foam | 0.083 | 0.28 | 0.22 | Repeat of #3. Greatly reduced violence. Slowly forming fire visible in video. A Plexiglas side plate was found unbroken. |
| 8 | Polyurethane Foam | 0.673 | 0.31 | 0.22 | Greatly reduced violence. Little propellant reaction visible in video. Propellant slabs did not burn. |
| 9 | Polyurethane Foam | 0.043 | 0.70 | 0.41 | |
| 10 | Polystyrene Foam | 0.012 | 1.52 | 0.87 | |

Figure 5:
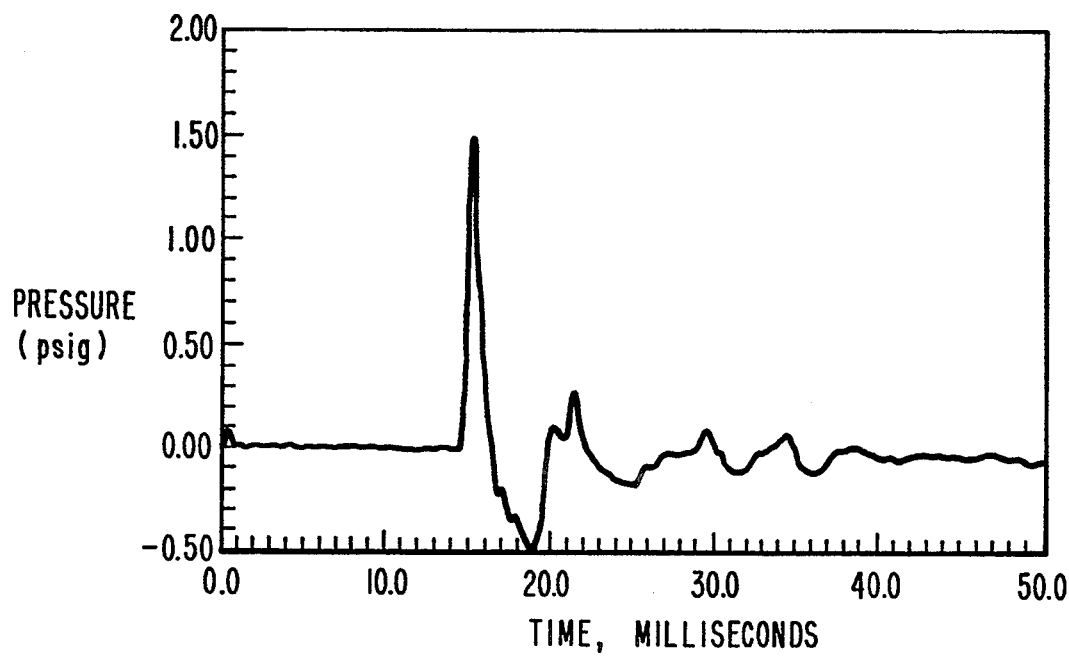
FIG. 5 is a graph which plots blast over pressure verses time for a projectile impact test of a propellant grain without a material mitigant in the bore.
Figure 6:
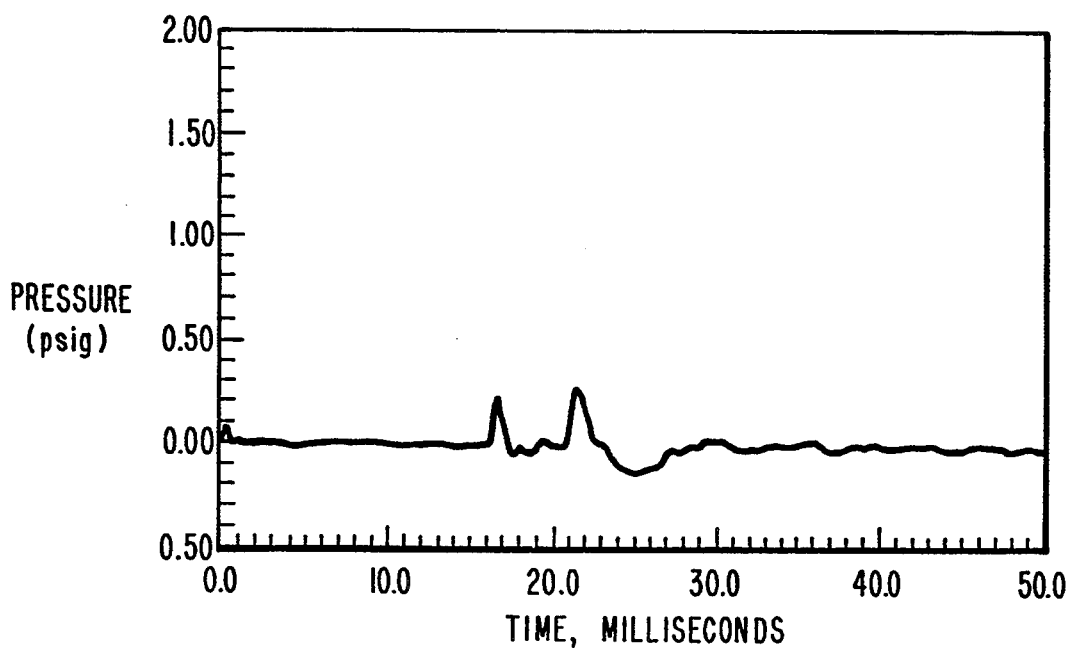
FIG. 6 is a graph which plots blast overpressure verses time for a projectile impact test of a propellant grain with a material mitigant in the bore.

FIGS. 5 and 6 are representative blast over pressure traces showing the effect of the use of material mitigants in rocket motor bores. FIG. 5 is a typical blast over pressure versus time curve for a rocket motor test cell having a conventional bore, and not using a mitigant. It can be seen that violent over pressure is experienced between 10.0 and 20.0 milliseconds. This corresponds to the timing of impact of the projectile and propellant cloud against the second propellant slab. This pressure curve represents an over pressure of explosive proporations.

FIG. 6 is a blast over pressure versus time curve for a rocket motor test cell using a mitigant material. The material used is a polyurethane foam of the type described with respect to samples 3 and 7. From FIG. 6 it can be seen that the overpressure shown in FIG. 5 is substantially eliminated. Thus, it is apparent that the present invention is effective in greatly reducing the risk of harm when a rocket motor is penetrated by a projectile, or otherwise violently disturbed. Thus, mitigant materials are found to be very effective in dealing with the safety concerns identified above.

Thus, the present invention meets each of the objects of the invention as described above. The present invention provides rocket motors and similar devices which are safer to handle and use than are conventional devices of this type. It is expected that the present invention will make it much easier for rocket motors to meet government insensitive munitions standards.

The present invention meets these objectives by controlling the flight and impact of fragmented propellant when a rocket motor is penetrated by a projectile in order to reduce the risk of ignition or explosion. This is also done simply and inexpensively, and without requiring significant changes in the manner in which rocket motors are designed and built. Indeed, existing rocket motors can be retrofit with the present invention and existing propellant formulations can also be used.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for mitigating the effect of unintended impact on a rocket motor, comprising the steps of:
   providing a rocket motor having a casing, a grain of propellant placed within said casing, and an internal bore disposed within said propellant grain; and
   placing within said core a sufficient quantity of a material mitigant such that if the rocket motor receives an unintended impact, the material mitigates the effects of the impact, said material mitigant having a density of not less than approximately 0.06 grams/cc.

2. A method for mitigating the effect of unintended impact as defined in claim 1 further comprising an air gap in the center of the material mitigant.

3. A method for mitigating the effect of unintended impact as defined in claim 1 wherein the material mitigant further comprises a filler.

4. A method for mitigating the effect of unintended impact as defined in claim 1 wherein the rocket motor is structured such that upon encountering a bullet strike the material mitigant mitigates the effects of the impact of the bullet and prevents ignition or explosion of the propellant.

5. A method for mitigating the effect of unintended impact as defined in claim 1 wherein the material mitigant is a foam.

6. A method for mitigating the effect of unintended impact as defined in claim 1 wherein the material mitigant is a polyurethane.

7. A method for mitigating the effect of unintended impact as defined in claim 1 wherein the material mitigant is a polystyrene.

8. A method for mitigating the effect of unintended impact as defined in claim 1 wherein the material mitigant comprises fibers.

9. A method for mitigating the effect of unintended impact as defined in claim 1 wherein the fibrous material mitigant comprises Kevlar ®.

10. A method for mitigating the effect of unintended impact as defined in claim 1 wherein the material mitigant is not reactive with the propellant.

11. A method for mitigating the effect of unintended impact as defined in claim 1 wherein the material mitigant is configured such that it absorbs fragments and fragment energy of propellant dislodged by the impact.

12. A method for mitigating the effect of unintended impact as defined in claim 1 wherein the material mitigant is placed within the bore in such a manner that it does not interfere with the normal ignition and operation of the rocket motor.

13. A rocket motor having means for mitigating the effect of unintended impact on the rocket motor, comprising a casing, a grain of propellant placed within said casing, an internal bore disposed within said propellant grain, and a sufficient quantity of material mitigant disposed within the bore such that if the rocket motor receives an unintended impact, the material mitigant mitigates the effects of the impact, said material mitigant having a density of not less than approximately 0.06 grams/cc.

14. A rocket motor as defined in claim 13 wherein the material mitigant is configured such that it absorbs fragments of propellant dislodged by the impact.

15. A rocket motor as defined in claim 13 wherein the material mitigant is placed within the bore in such a manner that it does not interfere with the normal ignition and operation of the rocket motor.

16. A rocket motor as defined in claim 13 further comprising an air gap in the center of the material mitigant.

17. A rocket motor as defined in claim 13 wherein the material mitigant further comprises a filler.

18. A rocket motor as defined in claim 13 wherein the rocket motor is structured such that upon encountering a bullet strike the material mitigant mitigates the effects of the impact of the bullet and prevents ignition or explosion of the propellant.

19. A rocket motor as defined in claim 13 wherein the material mitigant is a foam.

20. A rocket motor as defined in claim 13 wherein the material mitigant is a polyurethane.

21. A rocket motor as defined in claim 13 wherein the material mitigant is a polystyrene.

22. A rocket motor as defined in claim 13 wherein the material mitigant comprises fibers.

23. A rocket motor as defined in claim 13 wherein the fibrous material mitigant is Kevlar ®.

24. A rocket motor as defined in claim 13 wherein the material mitigant is not reactive with the propellant.

25. A rocket motor comprising a casing, a grain of propellant placed within said casing, an internal bore disposed within said propellant grain, and a sufficient quantity of material mitigant disposed within the bore such that upon encountering a bullet strike, the material mitigant mitigates the effects of the impact of the bullet and prevents ignition or explosion of the propellant, said material mitigant having a density of not less than approximately 0.06 grams/cc.

* * * * *

UNITED STATES PATENT AND TRADEMARK OFFICE
CERTIFICATE OF CORRECTION

PATENT NO. : 5,386,776
DATED : February 7, 1995
INVENTOR(S) : Robert L. Hatch et al.

It is certified that error appears in the above-identified patent and that said Letters Patent is hereby corrected as shown below:

Column 6, line 64, "due go" should be —due to—.

Signed and Sealed this

Seventh Day of November, 1995

Attest:

BRUCE LEHMAN

Attesting Officer

Commissioner of Patents and Trademarks